PULSE REGENERATING CIRCUIT HAVING TWO STABLE CONDITIONS

Filed May 10, 1962

INVENTORS
JOHANNES VAN BAARDEWIJK
JOHANNES B. KRIJNEN
GERRIT H. SCHOUTEN
BY
Frank R. Trifari
AGENT 3,330,967
PULSE REGENERATING CIRCUIT HAVING TWO STABLE CONDITIONS Johannes van Baardewijk, Johannes Baptist Krijnen, and Gerrit Hilbertus Schouten, Hilversum, Netherlands, assignors to North American Philips Company, Inc., New York, N.Y., a corporation of Delaware Filed May 10, 1962, Ser. No. 193,762
Claims priority, application Netherlands, May 31, 1961, 265,407
5 Claims. (Cl. 307—88)

The invention relates to a pulse regenerating circuit having two stable conditions which upon reception of a pulse to be regenerated is capable of independently passing from a given condition to the other condition and of producing a pulse in this process and comprises an electronic amplying element provided with positive feedback through windings arranged on a core of magnetic material having a rectangular hysteresis loop, a source of activating pulses coupled the core and capable of setting the core to the remanence condition corresponding with the given condition of the circuit and a source of pulses to be regenerated which act upon the core in the opposite sense, the latter source being also coupled to the core.

Such circuits are used, for example, in linear counters, shift registers, distribution circuits and logical circuits for performing arithmetical operations.

When a known circuit of this kind is set to the required condition, the pulse to be regenerated initiates a regeneration cycle of the pulse regenerating circuit, the duration of this cycle depending upon the proportioning of the circuit. Thus, the duration of the pulse produced by the circuit is a quantity determined by the circuit.

It is the object of the present invention to provide a pulse regenerating circuit of the kind described in the preamble, in which the duration of the regenerated pulse is adjustable at will.

The pulse regenerating circuit in accordance with the invention is characterized in that the electronic amplifying element is combined with a second electronic amplifying element to form a bistable circuit.

According to the invention a pulse regenerating circuit may simply be provided in which the first electronic amplifying element is a transistor of a particular conductivity type which satisfies the end in view and in the rest condition, that is to say, the condition between two regeneration cycles, consumes no supply current. This circuit in accordance with the invention is characterized in that the second eleceronic amplifying element in a transistor of a conductivity type oppose to that of the first transistor.

In order that the invention may readily be carried into effect, two embodiments thereof will now be described, by way of example, with reference to the accompanying diagrammatic drawings, in which.

In the figures similar reference characters relate to like circuit elements.

Figure 1:
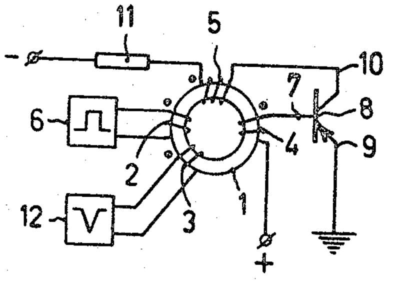
FIGURE 1 shows a known pulse regenerating circuit.

In FIGURE 1 a core of magnetic material having a rectangular hysteresis loop is designated 1. The core is provided with windings 2 to 5. A dot is positioned at one end of each of windings (2–5) and signifies that a voltage is induced in the winding when the core is switched from a negative remanence state to a positive remanence state which is more positive at the dotted end than at the undotted end. Conversely, when the remanence state switches from a positive to a negative state the undotted end is more positive than the dotted end. A pulse source 6 is capable of supplying pulses to the winding 2 to set the core to the positive remanence condition. The voltage induced in windings 4 and 5 when the core flips over from the negative remanence condition to the positive remanence condition are positive so that the potential of the base 7 of a transistor 8, which base is connected to the winding 4, rises with respect to the earthed emitter 9 and the transistor remains non-conductive. The collector 10 is connected through the winding 5 and a load resister 11 to the negative terminal of a supply source not shown in the figure. The current through the transistor 8 in the conductive condition flows from the emitter 9 to the collector 10 and through the winding 5 and the resistor 11 to the supply source. Through the winding 5 the collector current acts magnetically upon the core 1 to magnetize it in the negative sense when the transistor conducts.

When the core flips over from the positive remanence condition to the negative condition, the voltages induced in the windings 4 and 5 are negative. The base of the transistor 8 is also negative with respect to the emitter, because the voltage induced in the winding 4 has an absolute value exceeding the small positive bias voltage applied to the other end of the winding 4. Thus, the transistor 8 is conducting and the collector current magnetizes the core in the negative sense. In known manner the values of the circuit components are chosen so that under the control of the negative voltage induced in the winding 4 the collector current is maintained until the core is saturated in the negative sense and the voltage induced in the winding 4 collapses. Under the control of the positive bias voltage in series with the winding 4 the transistor now passes to the non-conductive condition and the collector current ceases to flow. The core now is in the negative remanence condition. The flip-over time of the remanence condition of the core is determined by the voltage which may be set up across a winding on the core. In the arrangement described the voltage across the winding 4 is substantially constant during the transition so that the duration of the pulse produced is determined by the value of this voltage. In general the duration of the regeneration cycle is determined by the elements of the circuit, for example the transistor, the core, the numbers of turns of the windings, etc.

A source 12 supplies pulses to be regenerated by the circuit described to the winding 3. The pulses, the duration of which generally will be shorter than the duration of the regeneration cycle magnetize the core in the negative sense. If the core is in the negative remanence condition, the flux variation produced by a pulse from the source 12 is only small because the flux follows the substantially level saturation branch of the hysteresis loop. The voltage induced in the winding 4 is then too small to change the condition of the transistor 8. If a pulse is supplied by the source 12 after the core has been brought to the positive remanence condition by an activating pulse from the source 6, the flux after passing the knee follows the steep part of the hysteresis loop so that there is a large variation of the flux. The voltages induced in the windings 4 and 5 are negative and the negative voltage induced in the windings 4 has an absolute value exceeding the absolute value of the positive bias voltage applied. The transistor becomes conducting and produces a pulse of a certain duration in the above-described manner.

Figure 2:
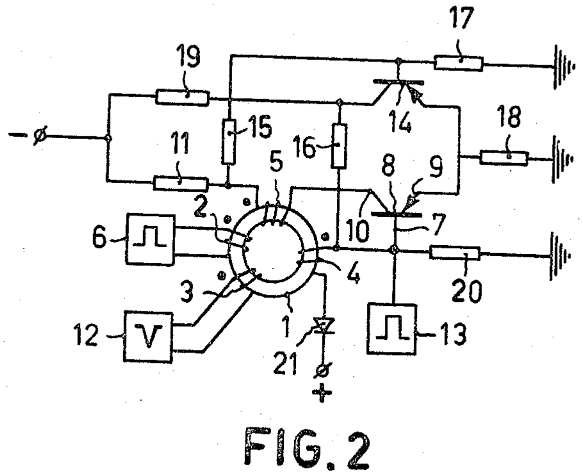
FIGURE 2 shows one embodiment of a circuit in accordance with the invention.

FIGURE 2 shows an embodiment of a circuit in accordance with the invention in which the transistor 8 on termination of the regeneration cycle is maintained conductive until a pulse from a source 13 causes the transistor to pass to the non-conductive condition. The circuit comprises a second transistor 14 the base and collector of which are connected through resistors 15 and 16 in the manner of a bistable circuit to the collector circuit and the base respectively of the transistor 8. In the rest condition of the circuit, that is to say, in the condition between two regeneration cycles, the transistor 14 is conducting, while the transistor 8 is non-conducting. The circuit further operates as follows. In the manner described hereinbefore the first pulse produced by the source 12 after the core 1 has been brought to the positive remanence condition by an activating pulse from the source 6 sets up a voltage at the base which is so negative that the transistor 8 becomes conducting. As a result the potential of the junction of the resistor 11 and the winding 5 rises. This potential increase acts through a voltage divider 15–17 upon the base of the transistor 14. The current through the transistor 14 decreases. As a result the potential of the common emitter connection, which through a resistor 18 is connected to earth, increases while the potential of the collector of transistor 14, which through a resistor 19 is connected to the negative terminal of the supply source, drops. This potential drop acts through a voltage divider 16–20 upon the base of the transistor 8 and augments the effect of the negative voltage of the winding 4. Then the flux of the core reaches the level negative saturation branch of the hysteresis loop under the control of the collector current of the transistor 8, the voltage induced in the winding 4 collapses. In the meantime the transistor 14 has passed to the non-conductive condition so that the negative voltage applied through the voltage divider 19–16–20 to the base of the transistor 8 is sufficient to maintain the transistor 8 conductive. The flux of the core is maintained in a point of the negative saturation branch of the hysteresis loop. A diode 21 connected in series with the winding 4 is maintained non-conductive by the negative voltage set up at the junction of the resistors 16 and 20 to separate the positive bias from the base.

A source 13 of reset pulses is connected to the base of the transistor 8. A pulse from this source is capable of temporarily increasing the potential of the base so that the transistor 8 passes to the non-conductive condition and the transistor 14 becomes conducting. The transistor 14 maintains the transistor 8 in the non-conductive condition. A pulse from the source 12 is capable of starting the next regeneration cycle when a pulse from the source 6 has brought the core to the positive remanence condition.

Figure 3:
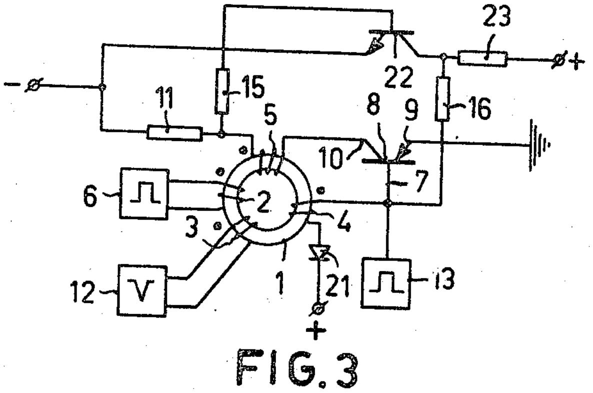
FIGURE 3 shows a preferred embodiment of a circuit in accordance with the invention.

FIGURE 3 shows a preferred embodiment of a circuit arrangement in accordance with the invention in which both transistors are non-conductive in the rest condition of the circuit. In this circuit there is added to the transistor 8 a second transistor 22 of opposite conductivity type. In the embodiment shown the transistor 8 is of the p-n-p type and the transistor 22 of the n-p-n type. The emitter of the transistor 22 is connected to the negative terminal of the supply source and the collecter is connected through a resistor 23 to the positive terminal of a second supply source, not shown. Feedback from the transistor 8 to the transistor 22 and conversely is provided through resistors 15 and 16 in a manner similar to that shown in FIGURE 2. The circuit further operates as follows. If the core is in the positive remanence condition, the first pulse from the source 12 starts the regeneration cycle. Owing to the fact that the transistor 8 becomes conductive the potential of the junction of the load resistor 11 and the winding 5 and also the potential of the base of the transistor 22, which base is connected to the junction through the resistor 15, increases. As a result the transistor 22 becomes conductive. The decrease of the potential of the collector of the transistor 22 acts through a resistor 16 upon the base of the transistor 8 in support of the effect of the negative voltage induced in the winding 4. When the flux in the core has reached the negative saturation branch of the hysteresis loop, the voltage induced in the winding 4 collapses and the negative potential applied through the resistor 16 acts to maintain the transistor 8 in the conductive condition. In this condition the diode 21 is cut off again. The transistor 8 maintains the transistor 22 in the conductive condition through the resistor 15. The circuit can be set to the rest condition under the control of a pulse applied by the source 13 to the base of the transistor in a manner similar to that described with reference to FIGURE 2.

The duration of the regeneration cycle of the circuit in accordance with the invention is adjustable by adjustment of the time interval between the occurrence of a pulse from the source 12 and of a reset pulse from the source 13.

What is claimed is:

1. A pulse regenerating circuit comprising, a core of magnetic material having two stable magnetic remanence states, first means including a first winding on said core for driving the core from the first toward the second stable magnetic remanence state when energized, second means including a first voltage responsive switch in series with a second winding on said core for controlling the flow of current through said second winding, a third winding on said core for providing a control voltage to close said first voltage responsive switch when the core transits from its first to its second stable state, third means including a second voltage responsive switch connected to the second winding and the first voltage responsive switch for holding the first voltage responsive switch closed once current flow through the second winding is started, and pulse supply means connected to said third winding for overriding the control of the second means to open the first voltage responsive switch.

2. A pulse generator as set forth in claim 1 in which said first and second voltage responsive switches are transistors of the same conductivity type and are alternately conductive.

3. A pulse generator as set forth in claim 1 in which said first and second voltage responsive switches are transistors of opposite conductivity types and are simultaneously conductive and non-conductive.

4. A pulse regenerating circuit comprising a core of magnetic material having first and second stable magnetic flux remanence states, first means including a first winding on said core for driving the magnetic flux in the core from the first toward the second stable flux state when energized, second and third windings on said core, a bistable multivibrator circuit having first and second alternately conducting amplifying elements, said second winding being connected in series with said first amplifying element and being arranged to drive said core into its second stable state when the first amplifying element conducts, said third winding connected to said first amplifying element to cause conduction to switch to the first amplifying element as a result of the voltage induced in the third winding when the core is driven by the first means from the first stable flux state toward the second stable flux state, and pulse supply means connected to said multivibrator circuit for switching conduction to the second amplifying element.

5. A pulse regenerating circuit comprising, a core of magnetic material having first and second stable magnetic flux remanence states, first means including a first winding on said core for driving the flux in the core from the first toward the second stable flux state when energized, second and third windings on said core, a bistable circuit having first and second transistors each of which is conductive in the first stable condition and non-conductive in the second, each of said transistors having emitter, base and collector electrodes, said second winding connected in series with the emitter-collector path of said first transistor to drive said core to the second stable flux state when the bistable circuit occupies the first stable condition, said third winding connected to the base electrode of said first transistor to cause conduction therethrough as a result of the voltage induced in said third winding when the core is driven toward the second stable flux state by the first means, first resistive means connecting the base electrode of said first transistor to the collector electrode of said second transistor, second resistive means connecting the base electrode of said second transistor to the collector electrode of said first transistor through said second winding for maintaining said first transistor in the conductive condition, and means connected to said bistable circuit for interrupting current flow through the first transistor.

References Cited

UNITED STATES PATENTS

| | | | |
|---|---|---|---|
| 2,886,801 | 5/1959 | Briggs | 307—88 X |
| 2,988,653 | 6/1961 | Samusenko | 307—88.5 |
| 3,237,015 | 2/1966 | Will | 307—80 |

OTHER REFERENCES

February 1960, Neff, G. W., Schulka, R. J., and Terlet, R. H., Magnetic Core Multivibrators. IBM Technical Disclosure Bulletin, vol. 2, No. 5.

BERNARD KONICK, *Primary Examiner.*

IRVING L. SRAGOW, M. K. KIRK, S. M. URYNOMICZ, *Assistant Examiners.*